March 9, 1943.    E. L. HANNA    2,313,703
RUBBER GOODS
Original Filed Jan. 2, 1937
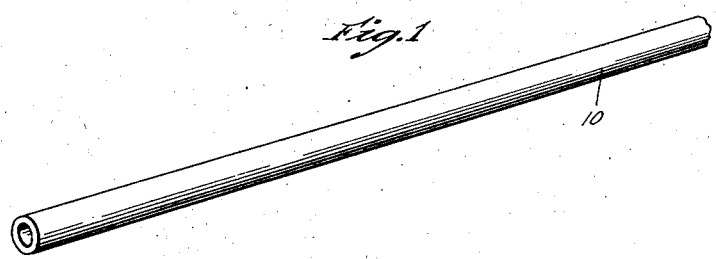
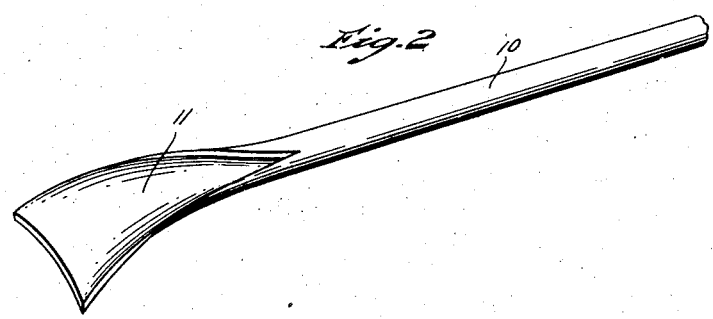
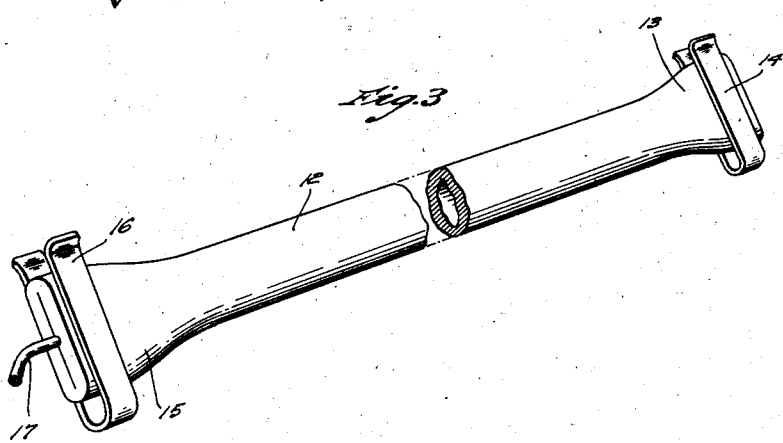
INVENTOR
Ezra Lloyd Hanna
BY
Nathaniel Frucht
ATTORNEY Patented Mar. 9, 1943

2,313,703

UNITED STATES PATENT OFFICE 2,313,703

RUBBER GOODS

Ezra Lloyd Hanna, North Scituate, R. I., assignor to Davol Rubber Company, a corporation of Rhode Island Original application January 2, 1937, Serial No. 118,829. Divided and this application September 15, 1941, Serial No. 410,845

3 Claims. (Cl. 117—139)

This application is a division of application Serial No. 118,829, filed January 2, 1937, entitled Manufacture of rubber goods.

My present invention relates to the manufacture of rubber goods, and has particular reference to the formation of the surface thereof.

Rubber articles designed for medical use require clean surfaces, free of any foreign matter. If the surface is exposed, it is comparatively simple to free the surface of any extraneous matter, and to sterilize the article for use. It is, however, difficult to free an inner surface, as for example the interior of an intravenous tube, from all foreign particles, and thus ensure an absolutely clean, sterile article for medical use.

It is the principal object of my invention to manufacture a rubber product having smooth, glassy, and clean inner surfaces.

With the above and other objects and advantageous features in view, my invention consists of a novel arrangement of parts more fully disclosed in the detailed description following, in conjunction with the accompanying drawing, and more specifically defined in the claims appended thereto.

In the drawing:

Fig. 1 is a plan view of an illustrative rubber article having an inner surface, the figure showing a tube;

Fig. 2 is a view of one end, broken away and spread to disclose the smooth interior surface; and Fig. 3 is a plan view showing the preferred arrangement during curing.

The manufacture of rubber articles having inner surfaces, such as tubes, involves the prevention of adhesion during handling, the preferred procedure utilizing a dusting powder, and the removal of the dusting powder and of extraneous foreign matter, such as dust, after the curing operation.

I have found it feasible to use a dusting material which will effectively prevent adhesion of tacky rubber surfaces, and which combines with the surface rubber during the curing operation to become an integral part thereof and to impart a smooth, glassy finish to the surface.

I have found that the stearates and oleates of certain metals, for example zinc, magnesium and calcium, have this property, the preferred material being zinc stearate. These compounds are excellent as dusting powders, and are absorbed by the rubber during the curing operation, the resulting surface being smooth, glassy, and absolutely clean. Thus, see Figs. 1 and 2, the tube 10 has a smooth inner surface 11 after curing, whereby sterilization and immediate use is possible.

I have also found that the inner surfaces of rubber articles should not be exposed to the atmosphere in the curing oven, as the temperature changes induce a flow of air therein and therethrough which includes dust particles. In curing tubes, it is preferred to close both ends, and to provide a vent at one end; thus, referring to Fig. 3, the tube 12 has one end 13 closed, as by means of a clip 14, and the other end 15 is also closed, as by means of a clip 16, but has a small vent tube, 17 secured therein, whereby the expanded air in the tube, during the curing, may freely exit. Since there is no circulation through the tube, and the dusting powder is absorbed in the inner rubber surface, the completed tube is dust-free and ready for sterilization and immediate use.

Although I have described my invention with specific reference to rubber tube manufacture, it is clear that the invention may be applied to the manufacture of any rubber article, and particularly article having inner surfaces, and that any suitable material may be used as a coating material for the surface thereof, which has the properties of preventing adhesion during handling and prior to curing, and of being absorbed by the rubber during the curing, so as to be completely removed.

A dusting powder such as described has an additional advantage when used with rubber articles which are acid cured, as for example in an acid sulphur chloride solution or vapor, as a surface coating of the dusting powder reacts with the solution or vapor, or is affected during the acid cure, so as to increase the translucence of the rubber articles; similarly, the transparency of transparent rubber articles, and particularly of dipped articles, is heightened. The novel dusting powder thus possesses important advantages over starch, talc or mica dusting powders, which do not affect the surface conditions.

While specific dusting powders have been described, the materials or their equivalents may be in the form of paste or liquid, if desired, to obtain the proper surface conditions.

I claim:

1. A rubber tube having a smooth, glassy inner surface, said surface having absorbed therein during curing a salt of a fatty acid selected from the group consisting of calcium oleate and zinc stearate.

2. A rubber tube having a smooth, glassy inner surface having absorbed therein zinc stearate during curing.

3. A rubber tube having a smooth, glassy inner surface having absorbed therein calcium oleate during curing.

EZRA LLOYD HANNA.